United States Patent [19]

Shoemaker et al.

[11] 3,930,110

[45] *Dec. 30, 1975

[54] MANUFACTURE OF MULTILAYER PANELS USING POLYISOCYANATE: FORMALDEHYDE BINDER SYSTEM

[75] Inventors: Philip D. Shoemaker, Baker; Hobert O. McQueary, Sweet Home, both of Oreg.

[73] Assignee: Ellingson Timber Co., Baker, Oreg.

[ * ] Notice: The portion of the term of this patent subsequent to Nov. 11, 1992, has been disclaimed.

[22] Filed: Feb. 11, 1974

[21] Appl. No.: 441,278

[52] U.S. Cl. ............... 428/424; 156/62.2; 156/307; 156/331; 428/537; 8/181; 8/192
[51] Int. Cl.² ..................... B32B 31/02; B29J 5/00
[58] Field of Search .......... 260/67 TN, 9, 29.3, 122, 260/123, 109; 117/161 L; 161/151, 190, 261, 263, 270, 156; 156/285, 62.2, 314, 315, 331, 335; 428/424; 8/192, 115.5, 116.4, 181, 187

[56] References Cited
UNITED STATES PATENTS

| | | | |
|---|---|---|---|
| 2,430,479 | 11/1947 | Pratt et al. | 156/331 |
| 3,180,784 | 4/1965 | Meiler | 161/151 |
| 3,242,230 | 3/1966 | Habib | 117/161 L |
| 3,268,467 | 8/1966 | Rye et al. | 260/29.3 |
| 3,309,444 | 3/1967 | Schueler | 264/109 |
| 3,490,989 | 1/1970 | Hohbach et al. | 117/161 L |
| 3,575,930 | 4/1971 | Dingbergs | 260/67 TN |
| 3,666,593 | 5/1972 | Lee | 156/285 |

FOREIGN PATENTS OR APPLICATIONS

| | | | |
|---|---|---|---|
| 678,853 | 9/1966 | Belgium | 260/67 TN |
| 2,109,686 | 9/1972 | Germany | |

*Primary Examiner*—George F. Lesmes
*Assistant Examiner*—R. J. Roche
*Attorney, Agent, or Firm*—Kolisch, Hartwell, Dickinson & Stuart

[57] ABSTRACT

Multiple ply structural panels, such as veneer-overlayed particleboard panels, are manufactured by bonding together the component materials under conditions of elevated pressure and temperature using a binder system comprising an organic polyisocyanate and formaldehyde. Through the use of this novel binder system, structural panels may be produced incorporating quantities of tree-derived materials such as bark and evergreen needles, previously considered unusable. Moreover, the physical properties and moisture resistance of the resultant products are competitive with those of conventional wood-based structural panels.

5 Claims, No Drawings

MANUFACTURE OF MULTILAYER PANELS USING POLYISOCYANATE: FORMALDEHYDE BINDER SYSTEM

RELATED APPLICATIONS

This application contains matter disclosed but not claimed in applicants' co-pending application Ser. No. 404,026, filed Oct. 5, 1973, the disclosure of which is incorporated herein by reference.

BACKGROUND OF THE INVENTION

The present invention relates generally to structural products manufactured from cellulosic materials, and to the use of a novel chemical binder system in manufacturing such products. In a preferred aspect of the invention, a polyisocyanate:formaldehyde binder system is employed in the manufacture of multiple layer structural panels having a core layer comprising comminuted wood.

Many structural products are manufactured by the basic process of consolidating or joining together bodies of cellulosic materials using pressure, heat, and a chemical binder. Included among them are wood-based products such as plywood, hardboard, particleboard, and veneer-faced particleboard, and pressed or molded products made from vegetable fibers, such as cornstalks, straw or bagasse, or from other cellulosic materials such as pulp, shredded paper, or the like. Typically, the adhesive or binders used in making such products are thermosetting resins such as phenol-formaldehyde, resorcinol-formaldehyde, melamine-formaldehyde, urea-formaldehyde, urea-furfural, and condensed furfuryl alcohol resins. Other known binders include organic polyisocyanates, which have been used for gluing plywood, and either along or together with urea- or melamine-formaldehyde resins as particleboard adhesives.

Each of the prior art binder systems has its drawbacks, however. For example, products made using urea-formaldehyde resins, widely employed in the manufacture of structural panels because of their low cost, are satisfactory for use in dry environments only. Good moisture resistance can be provided by using phenol-formaldehyde or melamine-formaldehyde resins, but such binders are too expensive for general purpose use. Another disadvantage of using urea-formaldehyde resins is that cellulosic starting materials ordinarily must be dried to a moisture content of about 2–5 percent by weight, based on the "bone dry" weight of the wood, before being mixed with the resin. Such drying is not required with polyisocyanate adhesives, but the affinity of isocyanates with metal causes severe sticking problems during pressing operations used in manufacturing multi-ply structural products, necessitating the use of release films or anti-stick coatings.

A general object of the present invention, therefore, is to provide an improved process for manufacturing multiple layer structural products through the use of an improved binder system free from the drawbacks of prior art systems.

A more specific object of the invention is to provide a process for manufacturing multilayer products using a polyisocyanate:formaldehyde binder system.

A further and related object of the invention is to provide multi-ply structural panels having a core comprising comminuted wood bonded together using an organic polyisocyanate and formaldehyde.

Other objects and advantages of the invention will become fully apparent from the following description and accompanying examples.

SUMMARY

According to the present invention, there is provided an improved method for producing multilayer structural products comprising cellulosic material. More particularly, there is provided a method for manufacturing multilayer products having a layer comprising comminuted cellulosic material bonded together using pressure, heat, and a binder system comprising an organic polyisocyanate and formaldehyde.

According to a preferred embodiment of the invention, a mass of comminuted cellulosic material, after being coated with the binder system components, is formed into a mat on a sheet of cellulosic material, such as paper or wood veneer, which has been coated with a suitable adhesive, such as an organic polyisocyanate. A second adhesive-coated sheet is placed on top of the mat, and the resulting "sandwich" is formed into a multi-ply structural panel in a heated press.

DESCRIPTION OF PREFERRED EMBODIMENTS

As will be appreciated, the method of the invention may be employed in the manufacture of a wide variety of multilayer products from many different cellulosic materials or mixtures of such materials. By way of illustration, however, the invention will be described with respect to the manufacture of multi-ply structural panels, and more particularly the manufacture of overlayed particleboard.

Overlayed particleboard, as that term is used herein, comprises a particleboard core layer to which is bonded a surface layer or ply of a suitable sheet material, such as wood veneer, paper, paperboard, high density laminated plastics such as Formica, sheet metals such as copper, aluminum and steel, etc. The particleboard core is produced according to the invention by bonding together particles of wood or other cellulosic material using heat, pressure, and a binder system comprising an organic polyisocyanate and formaldehyde. The particles which comprise the core are typically wood particles derived from lumber manufacturing waste, such as planer shavings, veneer chips, and the like. However, particles of any cellulosic material may be used. As used herein, the term "cellulosic material" includes any material substantially formed from cellulose, including natural materials such as wood and other tree components, e.g., bark, leaves, evergreen needles, etc., and vegetable materials such as straw, cornstalks, bagasse, rice hulls, etc., as well as processed materials such as pulp, paper, paperboard, and the like. The methods for producing suitable particles are well known and conventional. If desired, mixtures of cellulosic particles may be used.

The moisture content of the particles suitably may range up to about 22 percent by weight. Typically, particles made from lumber waste materials contain about 10–20 percent moisture, and thus may be used without first being dried. For economy in dryer operation, particles would ordinarily have a moisture content ranging upward from about 6 percent. Particles containing lesser amounts of moisture may be used, however.

The polyisocyanate component of the binder system may suitably be any organic polyisocyanate compound containing at least two active isocyanate groups per molecule. Such compounds include diphenylmethane diisocyanates, m- and p-phenylene diisocyanates, chlorophenylene diisocyanates, toluene di- and triisocyanates, triphenylmethane triisocyanates, and diphenyl ether-2,4,4′-triisocyanate. Polyphenylpolyisocyanates, such as diphenylmethane-4,4′-diisocyanates are particularly suitable. Polyisocyanate mixtures may also be used, such as "PAPI", a commercially available, approximately trifunctional polymethylene polyphenylisocyanate marketed by the Upjohn Company, Polymer Chemicals Division.

Formaldehyde is a gas at ordinary temperatures. Therefore, the formaldehyde component of the system preferably is an aqueous formaldehyde solution of any convenient concentration, such as commercially available 37, percent, 44 percent, etc., solutions.

The binder system components preferably are employed in a ratio of about one part organic polyisocyanate to about one-half to one part formaldehyde ("solids" basis). The ratio of the components is not considered critical, however, and the optimum ratio for a given application can be determined by routine experimentation. Polyisocyanate:formaldehyde ratios ranging from about 2:3 to about 5:1 have been used with good success. Ordinarily, ratios ranging between about 1:1 and 4:1 are used. The quantity of binder needed in a particular application likewise can be determined by simple experimentation. Amounts in the range of 2–5 percent by weight, based on the dry weight of cellulosic material, have been used with good results.

In the preferred practice of the invention, the binder components are added or applied to the particles comprising the core layer as they are tumbled or agitated in a blender. Preferably, the polyisocyanate and formaldehyde solution are added or applied separately, since they are not inherently miscible. Adding or applying the components as an emulsion or dispersion or other combined form is within the scope of the invention, however. The order of addition of the binder system components is unimportant, and they may be added simultaneously if desired.

Conventional additives, such as wax sizing or fire retardant, may be added to the particles during the blending step. Additional moisture may also be added, if necessary, to bring the moisture content of the blended mixture within the preferred range of about 12 to 18 percent moisture by weight.

After sufficient blending to produce a uniformly coated mixture, the particles are formed into a loose mat, or felt, on a sheet of the material which will form a surface ply, or layer, in the completed panel. As previously noted, such materials include wood veneer, paper, laminated plastic, etc. A second sheet is placed on top of the mat, and the resultant sandwich placed in a heated press where it is compressed into a multi-ply panel having a particleboard core layer. Pressing times, temperatures, and pressures vary widely depending on the thickness of the finished panel, the desired density of the panel, the size and type of particles used in the core layer and other factors known to those skilled in the art. By way of example, however, for ½ inch thick veneer-overlayed particleboard panels having a medium density core, pressures of about 300–350 psi at temperatures of about 325°–375°F. are typical. Pressing times are typically about 2–5 minutes.

To produce optimum bonding between the particleboard core and the surface layers, the sheets preferably are coated with an adhesive before being contacted with the particle mat or felt. Suitable adhesive compositions include the previously mentioned thermosetting binders, such as phenol-formaldehyde resins, and organic polyisocyanates. Preferably, the adhesive is one which forms moisture-resistant bonds, such as those exemplified.

Overlayed particleboard panels produced in the manner described have superior strength and moisture resistance. Moreover, they can be formed from cellulosic starting materials having relatively high moisture contents, i.e., up to about 22 percent by weight, without the necessity of predrying the material. These properties are thought to result from the novel binder system used in forming the particleboard core layer. By way of explanation, it is thought that isocyanate groups present in the polyisocyanate component of the system react with free hydroxyl groups present in the cellulosic material to form urethane linkages. Thus, when bodies of cellulosic material are consolidated in the presence of polyisocyanates under conditions of elevated pressure and temperature, "urethane bridges" are formed between adjacent cellulosic particles in the core as follows:

REACTION I

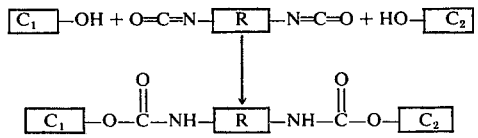

where $C_1$ and $C_2$ represent adjacent bodies of cellulosic materials, and R represents an organic group comprising the non-isocyanate "body" portion of a polyisocyanate molecule.

In addition, a portion of the polyisocyanate reacts with moisture present in the starting material to form a polyurea as follows:

REACTION II

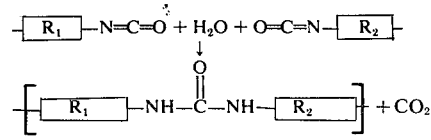

where $R_1$, $R_2$ represent organic groups comprising the non-isocyanate body portions of different polyisocyanate molecules.

The polyurea produced in this manner then reacts with the formaldehyde component of the system to form a polyurea-formaldehyde resin which aids in bonding the cellulosic particles together. Thus, the novel binder system provides direct chemical bonding through the formation of urethane bridges between adjacent particles in the core, as illustrated in Reaction I above, augmented by adhesive bonding from the polyurea-formaldehyde resin formed in situ.

The following examples, which are meant to be illustrative and not limiting, are given to describe further the method of the invention.

EXAMPLE I

A wood veneer-overlayed particleboard panel is produced as follows:

A 2 kilogram charge of Ponderosa pine planer shavings hammermilled to pass a ¼ inch diamond screen and containing 11.6 percent moisture by weight is placed in a baffled drum-type blender. With the blender drum rotating, the tumbling particles are separately sprayed with about 47.8 grams of a 37 percent aqueous formaldehyde solution and about 53.1 grams of a liquid polymethylene polyphenylisocyanate marketed as PAPI. To reduce moisture absorption in the finished product, about 35.4 grams of a microcrystalline wax emulsion containing 50 percent by weight wax solids is added. A suitable emulsion is marketed as "Paracol 915N" by Hercules, Inc.

After sufficient tumbling to obtain a uniform distribution of the additives, the coated particles are removed from the blender and formed into an approximately 3 inch thick mat on a 0.10 inch Douglas fir veneer sheet which has been spray-coated with 3 grams per square foot of PAPI. A second, identical PAPI-coated veneer sheet is disposed atop the particle mat. The resulting sandwich is placed in an electrically heated, hydraulically operated laboratory press between polished caul plates which have been treated with an anti-stick release composition. The sandwich is pressed at about 375°F. and a maximum pressure of about 315 psi for about 5 minutes to a thickness of 0.5 inch. The veneer-overlayed particleboard produced in this manner has an average density of about 40.5 pounds per cubic foot. When tested using industry standard ASTM procedures, the panel has an average modulus of rupture (MOR) of about 11,155 psi, and an average modulus of elasticity (MOE) of about 1,280,750 psi. For comparison, a standard ½ inch Douglas fir plywood panel is similarly tested, and has an MOR of about 5,360 psi and an MOE of about 716,600 psi. The moisture resistance of the overlayed particleboard panel equals or exceeds that of such panels made using a phenol-formaldehyde resin binder for the core.

EXAMPLE II

A veneer-faced particleboard panel is produced as described in Example I, except that the veneer face sheets are sprayed with 2 grams per square foot of a phenol-formaldehyde resin, rather than the polyisocyanate resin used in Example I. A suitable phenol-formaldehyde resin is a 48 percent solids liquid resin designated OPL-197A and sold by the Coos Bay Division of Georgia-Pacific Corporation. The resulting product is equivalent to that obtained by the procedure of Example I, but problems resulting from sticking of the panel face sheets to the press caul plates are eliminated, thus doing away with the necessity to treat the caul plates with a release composition.

EXAMPLE III

A paperboard-faced particleboard panel is produced as follows:

While tumbling in a drum-type blender, a charge consisting of 1700 grams Ponderosa pine planer shavings hammermilled to pass a ¼ inch diamond screen and having a 12.6 percent moisture content, and 700 grams screened (−5, +16 Tyler) Ponderosa pine bark particles containing 9.0 percent moisture is separately sprayed with about 57.5 grams of a 37 percent aqueous formaldehyde solution and about 63.5 grams of PAPI. About 42.4 grams of Paracol 915N wax sizing is also added. The resulting mixture of coated wood and bark particles contains about 13.1 percent moisture by weight. After blending, the particle mixture is formed into a mat on a 0.018 inch thick sheet of phenol-formaldehyde coated Crezon, a high density resin-coated paperboard available from Crown Zellerback Corporation. A second Crezon sheet is placed on top of the mat, and the resulting sandwich is pressed at about 375°F. and a maximum pressure of 315 psi for 5 minutes to a thickness of 0.5 inch. The resulting paperboardfaced panel has a particleboard core containing about 30 percent bark on a dry basis. The board has an average density of 41.3 pounds per cubic foot, an average MOR of 2,125 psi, and an average MOE of 338,500 psi when tested using ASTM procedures. The paperboard facing is very tightly bonded to the particleboard core and the resulting panel has excellent moisture resistance.

EXAMPLE IV

A structural panel having a core made from the comminuted content of an entire tree is produced as follows:

A small, green Lodgepole pine tree section, including trunk, limbs, bark, needles and all, is passed through a chipper, then hammermilled to pass a ¼ inch diamond screen. A charge consisting of 2500 grams of the resulting comminuted material, which contains 15 percent moisture by weight, is separately sprayed with about 43 grams of a 37 percent formaldehyde solution and about 64 grams of PAPI while tumbling in a drum-type blender. After blending, the resulting mixture of binder-coated wood, bark, needles, etc. particles containing about 18.2 percent moisture by weight is formed into a mat on a 0.018 inch thick sheet of Crezon B210. A second Crezon sheet is placed on top of the mat, and the resulting sandwich pressed at about 375°F. and a maximum pressure of about 315 psi for 5 minutes to a thickness of about 0.48 inch. The resulting paperboard-faced, particleboard core panel has an average density of 43.5 pounds per cubic foot, an average MOR of 1,954 psi, and an average MOE of 352,750 psi when testing using ASTM procedures.

EXAMPLE V

A veneer-faced structural panel having a core made from the comminuted content of a recently dead Lodgepole pine tree is produced in the manner described in Example IV, using 0.1 inch Western Larch veneer sheets in place of the Crezon sheets. The binder system for the particles consists of 1.5 percent by weight PAPI and 0.5 percent by weight formaldehyde (solids basis), based on the dry weight of the particles. Prior to forming the particle mat, the veneer face sheets are sprayed with 2 grams per square foot of OPL-197A, as in Example II. The finished panel has a thickness of about 0.75 inch and an average density of about 40 pounds per cubic foot. Tested using ASTM procedures, it exhibits an average MOR of about 6,600 psi, and an average MOE of about 985,000 psi.

There is thus provided an improved method for manufacturing multilayered structural products having a layer comprising consolidated comminuted material bonded together using heat, pressure, and a binder system comprising an organic polyisocyanate and formaldehyde. The method of the invention provides several significant advantages. One of them is the ability to produce structural products using materials previously considered commercially unusable or undesirable. For example, in producing such products a tree's bark, limbs, and needles or leaves can be used, as well as its trunk wood. This provides obvious manufacturing economies and greatly increases the utilization of a natural resource. At the same time, however, the products produced are fully competitive in external appearance and physical properties with presently used structural panel products.

Further advantages include the ability to utilize directly materials having relatively high moisture contents, i.e., up to about 22 percent by weight, eliminating the necessity of predrying the raw material, and thus conserving energy. Despite such high moisture contents, particleboard core products may be produced without experiencing blistering or "blows" caused by steam formation during the press cycle.

Still further, it should be noted that no separate catalyst for the polyisocyanate:formaldehyde binder system is required.

While a particular embodiment of the invention has been described, variations and modifications are obviously possible without departing from the spirit of the invention, and it is not intended by this disclosure to be limited to the specific details set out above.

It is claimed and desired to secure by Letters Patent:

1. A multilayer structure comprising a layer formed by
   providing a mass of comminuted cellulosic material,
   coating said mass with an organic polyisocyanate having at least two active isocyanate groups per molecule and with an aqueous formaldehyde solution, and
   consolidating the coated mass containing polyisocyanate, formaldehyde, and water by applying pressure and heat for a time sufficient to bond the material together, the ratio of polyisocyanate to formaldehyde by weight being within the range of 2:3 to 5:1.

2. The structure of claim 1, wherein said comminuted material is selected from the group consisting of wood particles and bark particles.

3. The structure of claim 1, wherein said polyisocyanate is a polyphenylpolyisocyanate.

4. The structure of claim 1, wherein said comminuted material, before coating, contains between about 6 and about 22 percent moisture by weight.

5. The structure of claim 1, wherein said mass is coated with about 1 to 3 weight percent of said polyisocyanate and about ½ to 3 weight percent of formaldehyde, said mass, before coating, containing about 10 to about 20 percent moisture by weight.

* * * * *